(12) United States Patent
Domig et al.

(10) Patent No.: US 11,473,617 B2
(45) Date of Patent: Oct. 18, 2022

(54) SLIDING BEARING FOR A STEERING SPINDLE AND STEERING COLUMN FOR A MOTOR VEHICLE

(71) Applicants: THYSSENKRUPP PRESTA AG, Eschen (LI); thyssenkrupp AG, Essen (DE)

(72) Inventors: Markus Domig, Bartholomäberg (AT); Thomas Raich, Vandans (AT)

(73) Assignees: THYSSENKRUPP PRESTA AG, Eschen (LI); THYSSENKRUPP AG, Essen (DE)

(*) Notice: Subject to any disclaimer, the term of this patent is extended or adjusted under 35 U.S.C. 154(b) by 559 days.

(21) Appl. No.: 16/488,496

(22) PCT Filed: Feb. 23, 2018

(86) PCT No.: PCT/EP2018/054584
§ 371 (c)(1),
(2) Date: Aug. 23, 2019

(87) PCT Pub. No.: WO2018/154079
PCT Pub. Date: Aug. 30, 2018

(65) Prior Publication Data
US 2019/0390709 A1 Dec. 26, 2019

(30) Foreign Application Priority Data
Feb. 27, 2017 (DE) .................. 10 2017 203 101.8
Aug. 8, 2017 (DE) .................. 10 2017 213 807.6

(51) Int. Cl.
*F16C 17/02* (2006.01)
*B62D 1/16* (2006.01)
(Continued)

(52) U.S. Cl.
CPC ............ *F16C 17/02* (2013.01); *B62D 1/16* (2013.01); *F16C 25/02* (2013.01); *F16C 33/201* (2013.01); *B62D 1/185* (2013.01); *F16C 2326/24* (2013.01)

(58) Field of Classification Search
CPC ........ F16C 17/00; F16C 35/02; F16C 33/201; F16C 17/02; F16C 25/02; F16C 2326/24;
(Continued)

(56) References Cited

U.S. PATENT DOCUMENTS 3,846,034 A * 11/1974 Halliger ................ F16C 35/063
403/351
5,688,054 A * 11/1997 Rabe ..................... F16C 27/063
29/898.059
(Continued)

FOREIGN PATENT DOCUMENTS

CN 1747867 A 3/2006
CN 102632957 A 8/2012
(Continued)

OTHER PUBLICATIONS

Electronic English translation of FR 2 685 415 to Pretto et al.*
(Continued)

*Primary Examiner* — James A English
*Assistant Examiner* — Tiffany L Webb
(74) *Attorney, Agent, or Firm* — thyssenkrupp North Amerca, LLC

(57) ABSTRACT

A plain bearing for a steering spindle of a steering column for a motor vehicle. The bearing includes an inner ring with an axially continuous bearing opening for slidably receiving the steering spindle. A prestressing element is configured to exert a prestressing force on the inner ring to clamp the inner ring on the steering spindle and thereby to assign a defined, uniform braking torque.

22 Claims, 7 Drawing Sheets

(51) Int. Cl.
*F16C 25/02* (2006.01)
*B62D 1/185* (2006.01)
*F16C 33/20* (2006.01)

(58) Field of Classification Search
CPC .... F16C 2226/60; F16C 27/02; F16C 27/063; B62D 3/66; B62D 1/16; B62D 1/185; F16D 3/52; F16D 3/68; F16D 1/0805
See application file for complete search history.

(56) References Cited

U.S. PATENT DOCUMENTS

| | | | | |
|---|---|---|---|---|
| 6,733,039 | B2 * | 5/2004 | Honda | B62D 1/16 |
| | | | | 280/780 |
| 6,802,648 | B2 * | 10/2004 | Merot | F16C 27/063 |
| | | | | 384/909 |
| 9,903,414 | B2 * | 2/2018 | Campbell | F16C 19/525 |
| 2005/0070365 | A1 | 3/2005 | Riefe | |
| 2006/0156855 | A1 | 7/2006 | Yukawa | |
| 2013/0126259 | A1 | 5/2013 | Jung | |
| 2014/0319811 | A1 | 10/2014 | Bussit et al. | |
| 2015/0000456 | A1 | 1/2015 | Schnitzer | |
| 2015/0053041 | A1 | 2/2015 | Schnitzer | |
| 2015/0191195 | A1 | 7/2015 | Domig et al. | |
| 2016/0025144 | A1 * | 1/2016 | Giroud | F16C 41/04 |
| | | | | 384/448 |
| 2016/0201725 | A1 | 7/2016 | Schafer et al. | |
| 2017/0015345 | A1 | 1/2017 | Galehr | |
| 2018/0209417 | A1 * | 7/2018 | Aleker | F04C 2/102 |

FOREIGN PATENT DOCUMENTS

| | | |
|---|---|---|
| CN | 204659802 U | 9/2015 |
| CN | 105452086 A | 3/2016 |
| CN | 105673685 A | 6/2016 |
| CN | 205365722 U | 7/2016 |
| CN | 205686460 U | 11/2016 |
| CN | 106232455 A | 12/2016 |
| DE | 2 249 906 A1 | 4/1974 |
| DE | 42 31 272 A | 3/1994 |
| DE | 199 45 164 A | 4/2000 |
| DE | 201 03 203 U | 7/2001 |
| DE | 10 2006 019 576 A | 11/2007 |
| DE | 603 1 6 643 T | 7/2008 |
| DE | 20 2012 102 159 U | 7/2012 |
| DE | 10 2012 105 151 B | 7/2013 |
| DE | 10 2012 101 147 A | 8/2013 |
| DE | 10 2012 104 644 B | 8/2013 |
| EP | 0 805 090 A | 11/1997 |
| EP | 1 184 583 A1 | 3/2002 |
| EP | 1 652 748 A | 5/2006 |
| EP | 2 768 713 B | 4/2016 |
| FR | 2 031 653 A | 11/1970 |
| FR | 2 661 959 A | 11/1991 |
| FR | 2 674 646 A | 10/1992 |
| FR | 2 685 415 A | 6/1993 |
| FR | 2 714 126 A | 6/1995 |
| GB | 2 345 520 A | 7/2000 |
| JP | 2005-262968 A | 9/2005 |
| KR | 2013-0056118 A | 5/2013 |
| WO | 2015/172781 A1 | 11/2015 |

OTHER PUBLICATIONS

Electronic English translation of FR 2 661 959 to Mouhot et al.*
International Search Report issued in PCT/EP2018/054584, dated May 8, 2018.

* cited by examiner

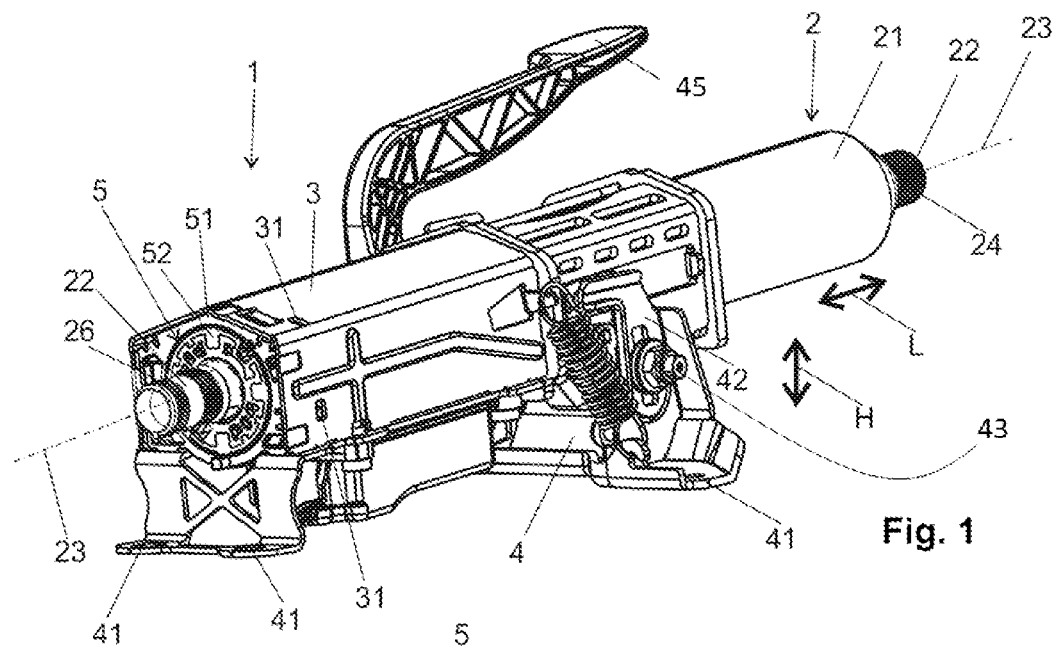
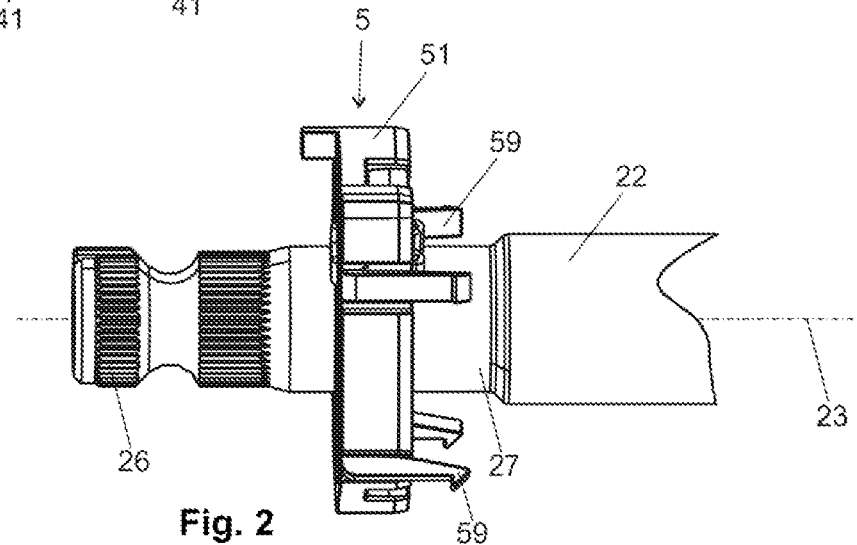
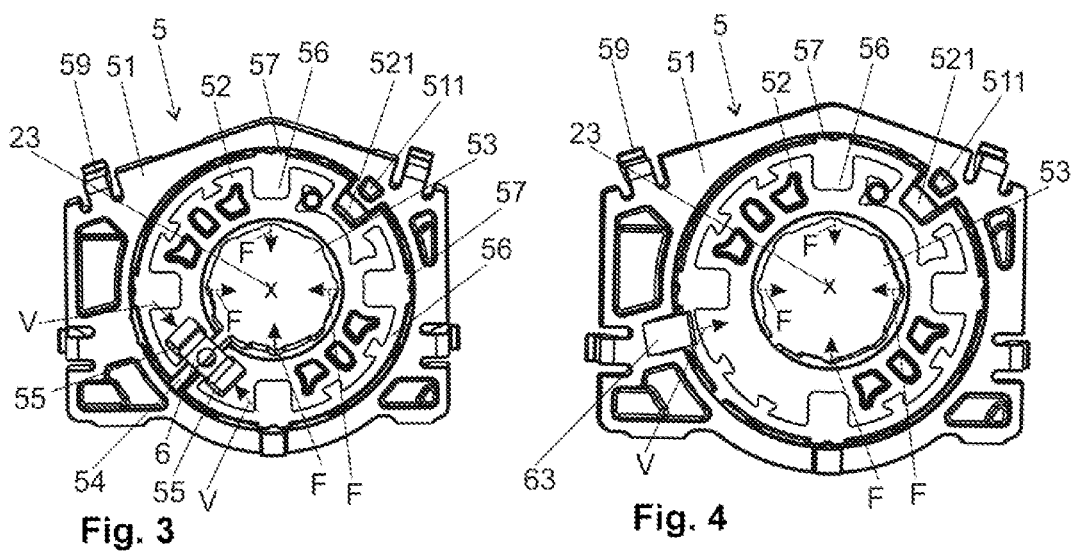

SLIDING BEARING FOR A STEERING SPINDLE AND STEERING COLUMN FOR A MOTOR VEHICLE

CROSS REFERENCE TO RELATED APPLICATIONS

This application is a U.S. National Stage Entry of International Patent Application Serial Number PCT/EP2018/054584, filed Feb. 23, 2018, which claims priority to German Patent Application No. DE 10 2017 213 807.6, filed Aug. 8, 2017, and German Patent Application No. DE 10 2017 203 101.8, filed Feb. 27, 2017, the entire contents of which are incorporated herein by reference.

FIELD

The present disclosure generally relates to a plain bearing for a steering spindle of a steering column for a motor vehicle.

BACKGROUND

Steering columns for motor vehicles comprise a steering spindle, also known as a steering shaft, on which the steering wheel is mounted at its rear end in regard to the direction of travel and which is rotatably mounted in a casing unit, also known as a guide box, and supported on the vehicle bodywork. Furthermore, it is known how to design the steering spindle to be adjustable in the longitudinal direction, in order to set the steering wheel position, so that it is formed from two torque-locking interconnected shaft pieces which are telescopic in their longitudinal axis, for example by axially nested profile shafts. The shaft piece which is telescopically adjustable in the longitudinal direction relative to the casing unit is rotatably mounted in an inner casing tube, which in turn is received telescopically in said casing unit in the direction of the axis. With the other shaft piece, which is firmly positioned in the direction of the axis relative to the casing unit, the steering spindle is rotatably mounted and braced in this casing unit.

In order to assure a smooth transmission of the applied steering torque and a radial bracing in each adjustment position, the steering spindle has multiple bearing points along its length. In particular, it is known in the prior art, for example from DE 10 2012 105 151 B3, how to mount the steering spindle on the adjustable shaft piece in two axially spaced roller bearings in the casing tube, and to mount it on the axially fixed shaft piece in a plain bearing in the casing unit which is axially spaced apart from the first shaft piece.

The plain bearing, which as a third bearing on the same axis constitutes an overdetermination, serves primarily for the resilient supporting and positioning of the steering spindle in the casing unit, and it is only relatively slightly stressed by bearing forces, which are chiefly absorbed by the mentioned roller bearings. Therefore, the steering spindle in the mentioned prior art is mounted in sliding rotatable manner in an inner ring, which in turn is designed for mounting in the casing unit in an outer ring. It is proposed, in the known example, to make the inner ring from an elastic plastic, and in addition to split it radially by a radial slot, so that slight radial forces will act between the mutually sliding bearing surfaces on the inside of the bearing opening and the outside of the steering spindle, so as to achieve the slightest possible sliding friction. In order to further reduce the bearing friction, it is furthermore proposed to use plastics with good sliding properties or to design the surfaces in a friction reducing manner. Thanks to these measures, an especially smooth mounting is realized with little frictional or damping torque.

However, too smooth a mounting opposing no perceptible resistance to a manual steering maneuver on account of the steering assist generally present in modern motor vehicles produces an unpleasant steering feel. Therefore, a dampening is desirable for a pleasant and high-quality haptics in which a defined, uniformly gently sliding braking torque opposes a turning of the steering spindle. But this cannot be provided by means of the known mounting, which is optimized for slight bearing friction.

Thus a need exists for a plain bearing by which a defined uniform braking torque can be set.

BRIEF DESCRIPTION OF THE FIGURES

FIG. 1 is a schematic perspective view of a steering column.

FIG. 2 is a detailed view of the steering column of FIG. 1.

FIG. 3 is an axial view of a plain bearing of a steering column per FIG. 1.

FIG. 4 is an axial view of a plain bearing for the mounting of a steering spindle.

DETAILED DESCRIPTION

Figure 5:
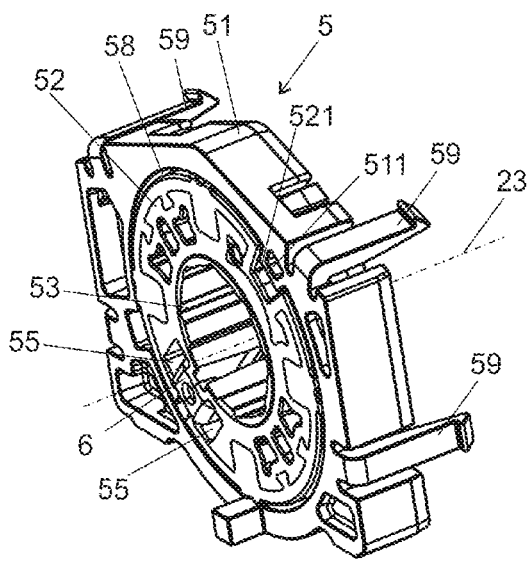
FIG. 5 is a perspective view of the plain bearing per FIG. 3.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a plain bearing for a steering spindle of a steering column for a motor vehicle, having an inner ring with an axially continuous bearing opening for slidably receiving the steering spindle, and which is surrounded by an outer ring. Furthermore, the invention relates to a steering column with such a plain bearing.

According to the invention, it is proposed for a plain bearing of this kind that at least one prestressing element is arranged in such a way that it exerts a prestressing force on the inner ring, for the clamping of the inner ring on the steering spindle. Preferably, the at least one prestressing element is arranged in such a way that it exerts a prestressing force on the inner ring in the direction of a narrowing of the bearing opening for clamping the inner ring on the steering spindle.

The plain bearing according to the invention comprises a prestressing element which interacts with the inner ring. The prestressing element comprises a force generating means, which generates a static force as the prestressing force, acting in permanent manner on the inner ring. The prestressing force is applied to the inner ring in such a way that the inner wall of the bearing opening, which forms the bearing surface for the inner ring, is loaded in the direction of a narrowing of the bearing opening. The application of a defined prestressing force to the inner ring by means of the prestressing element according to the invention may thus serve for the clamping of the inner ring on the steering spindle mounted in the bearing opening, so that the inner circumferential surface and/or the outer circumferential surface of the inner ring can be reduced. In this process, the bearing surface of the inner ring is pressed with a defined prestressing force against the bearing surface of a steering spindle mounted in the inner ring. The size of the prestressing force determines the frictional force occurring between the mutually sliding bearing surfaces, which opposes a turning of the steering spindle in the inner ring of the plain bearing when a steering torque is manually applied, as a damping or braking torque. Thanks to the prestressing element, the bearing friction of the plain bearing can be easily increased in a targeted manner by increasing the prestressing force, in order to generate a noticeable counter-torque during a steering process, which is perceived as being pleasant.

Thanks to the invention, a structural element present in a steering column, namely the plain bearing, can be given an additional function, namely, a damping or braking action, which enables an optimization of the haptics. The additional functionality can be realized with little expense.

It is advantageous in the invention that the size of the prestressing force can be set in defined manner by the prestressing element, regardless of the inner ring. In this way, it is possible for example to employ the inner ring made from a material with suitable bearing and sliding properties and good long-term stability, even though the elasticity and mechanical stability is too low to provide a sufficiently large bearing friction needed to generate the optimal damping or braking action. Thanks to the design of the prestressing element, a prestressing force can be set which is adapted to the particular use, so that different haptic properties of a steering column can be produced with an inner ring.

Preferably, the prestressing element is designed as a spring element, preferably made of spring steel. By a corresponding clamping or deformation of the spring element, the elastic spring force acting as a counter force may be utilized according to the invention as a static prestressing force and channeled into the inner ring. By the application of the spring force, the bearing surface on the inside of the bearing opening is permanently loaded radially inward, and thus it can be braced against the steering spindle to generate a defined frictional torque. A spring element with small dimensions can be provided from spring steel, with which a sufficiently large prestressing force can be provided. In this way, an easy integration in a plain bearing can be accomplished. A further benefit is that spring steel retains its elastic properties for a long time and ensures a uniform prestressing force and accordingly a uniform damping and sliding behavior over the entire lifetime of the steering column.

The inner ring may be formed from plastic, preferably as an injection molded plastic part. The use of plastics for the inner ring of the plain bearing has the advantage that, together with the steering spindle normally made of steel, a long-lasting low-wear and reliable bearing pairing is possible. Thanks to the choice of suitable plastics, the desired sliding properties can be dictated within broad limits, for example in order to lessen undesirable static friction ("stick-slip") effects, or to increase or decrease the friction deliberately by the addition of additives. Fabrication as an injection molded plastic part from a thermoplastic elastomer can be done rationally in the most diverse of configurations, optimally suited to the respective use.

Thanks to the prestressing element according to the invention, the frictional effects needed for the desired damping or braking action can be established largely regardless of the elastic properties of the plastic. For example, a low-friction sliding, mechanically resistant, yet flexurally soft or less elastic plastic can be radially pressed by the additional prestressing element according to the invention with correspondingly large prestressing force against the bearing surface of the steering spindle in order to generate a defined bearing friction corresponding to the desired braking or damping torque.

One advantageous embodiment of the invention proposes that the inner ring has a radial slot, wherein the prestressing element bridges over the slot and pulls it together in the circumferential direction. Preferably the at least one prestressing element is arranged such that it exerts on the inner ring a prestressing force in the direction of a narrowing of the bearing opening for the clamping of the inner ring on the steering spindle. The inner ring in this configuration is split, and thus formed substantially open in C shape or U shape. Such a design is known in principle from the aforementioned prior art and has the benefit of easy mountability on the steering spindle. However, the known inner ring can only rest with very slight radial force against the bearing surface of the steering spindle, so that the setting of a defined, sufficiently large damping or braking torque is not possible. According to the invention, the prestressing element is mounted on the open inner ring in such a way that it pulls the free ends of the inner ring facing each other in the slot in the circumferential direction toward each other in the circumferential direction. In other words, the prestressing force acts to narrow the width of the slot. In this way, the inner ring is pulled together in the manner of a pipe clip, and the prestressing force introduced by the prestressing device in the circumferential direction into the inner ring is diverted into a radially inward directed force, which squeezes the bearing opening together, i.e., compresses it. One benefit is the large force transmission, so that a relatively small prestressing force exerted by the prestressing device in the circumferential direction is converted into a relatively large radial force with which the bearing opening of the inner ring on the steering spindle can be braced.

A further benefit is that, thanks to the prestressing element, the inner ring initially open due to the slot becomes closed in the circumferential direction, so that a closed ring-shaped structure is formed, which increases the rigidity of the bearing assembly formed from the steering spindle and the inner ring as compared to the prior art. The increased rigidity and the resulting higher eigenfrequency improve the mechanical operating properties of a steering column outfitted with such a plain bearing.

A C-shaped or U-shaped inner ring with a radially continuous slot can be fabricated with little expense as an injection molded plastic part.

In the aforementioned embodiment, it may be provided that the prestressing element is configured as a clamp and is connected in the axial direction to the inner ring. The prestressing element may be C-shaped or U-shaped or stirrup-shaped as a spring clip, which can be produced in especially rational manner and with required elastic properties as a bent or bent and stamped part made of spring steel wire or plate. In the clamp-like configuration, for example in the U-shape, the prestressing element may have legs engaging in the axial direction with recesses formed in the inner ring. The recesses may be openings, for example, which are formed in the axial direction in the area of the oppositely facing ends at the slot in the inner ring, and in each of which one leg of a U-shaped or C-shaped spring clip is inserted in the axial direction, so that the bow of the spring clip spans the slot, and a form fit is produced in the circumferential direction. In this way, the inner ring becomes axially closed at the end face by the prestressing element fashioned as a spring clip, and the legs exert the prestressing force on the inner ring by pulling the oppositely facing ends in the slot toward each other in the circumferential direction. In this way, the bearing opening is compressed.

Regarding the mounting, it is advantageous that the initially still open split inner ring can be easily mounted under elastic bending in the axial direction onto a steering spindle, and the actual clamping occurs only by axial inserting of the spring clip in the inner ring. Alternatively, it is possible to first install the prestressing element, and then place the inner ring on the steering spindle.

A further benefit of the clamp-like design of the prestressing element, besides the small structural shape and the easy integration in an existing bearing concept of a plain bearing, is that due to the material thickness of the spring steel wire or plate the elastic properties and the size of the prestressing force can be changed and adapted with little expense.

Alternatively, it is conceivable to provide other fastening means, preferably by mutually corresponding form fit elements on the inner ring and the prestressing element.

It may be provided that the inner ring is surrounded by an outer ring. The inner ring may be arranged substantially coaxially in a receiving opening inside the outer ring and be held therein. The outer ring can be mounted in the casing unit of a steering column.

One development may involve at least one radial compensation element being arranged between the inner ring and the outer ring. Because the compensation element has an elastic springy configuration in the radial direction, a radially resilient supporting or suspending of the inner ring in the outer ring can be realized by one or more compensation elements, so that the entire inner ring can be radially mounted inside the outer ring, in order to compensate for an offset between the steering spindle axis and the bearing axis, which may occur due to the aforementioned overdetermination in an arrangement with three bearings.

Flexible intermediate pieces made of elastic material can be arranged for example as compensation elements radially between inner and outer ring. A spring element such as an elastomer spring made of an elastically deformable profile of rubber-like material acting in the radial direction between inner and outer ring can be used as a compensation element. A compensation element can also be provided in that the inner ring is overmolded with a more elastic material. For this, the inner ring in a binary injection molding process can be encased on its outer circumference all around or for a portion with a resilient, soft, thermoplastic elastomer material.

The invention furthermore relates to a plain bearing for a steering spindle of a steering column for a motor vehicle, having an inner ring with an axially continuous bearing opening for slidably receiving the steering spindle. Furthermore, the invention relates to a steering column with such a plain bearing.

Steering columns for motor vehicles comprise a steering spindle, also known as a steering shaft, on which the steering wheel is mounted at its rear end in regard to the direction of travel and which is rotatably mounted in a casing unit, also known as a guide box, and supported on the vehicle bodywork. Furthermore, it is known how to design the steering spindle to be adjustable in the longitudinal direction, in order to set the steering wheel position, so that it is formed from two torque-locking interconnected shaft pieces which are telescopic in the direction of their longitudinal axis, for example by axially nested profile shafts. The shaft piece which is telescopically adjustable in the longitudinal direction relative to the casing unit is rotatably mounted in an inner casing tube, which in turn is received telescopically in said casing unit in the direction of the axis. With the other shaft piece, which is firmly positioned in the direction of the axis relative to the casing unit, the steering spindle is rotatably mounted and braced in this casing unit.

In order to assure a smooth transmission of the applied steering torque and a radial bracing in each adjustment position, the steering spindle has multiple bearing points along its length. In particular, it is known in the prior art, for example from DE 10 2012 105 151 B3, how to mount the steering spindle on the adjustable shaft piece in two axially spaced roller bearings in the casing tube, and to mount it on the axially fixed shaft piece in a plain bearing in the casing unit which is axially spaced apart from the first shaft piece.

The plain bearing, which as a third bearing on the same axis constitutes an overdetermination, serves primarily for the resilient supporting and positioning of the steering spindle in the casing unit, and it is only relatively slightly stressed by bearing forces, which are chiefly absorbed by the mentioned roller bearings. Therefore, the steering spindle in the mentioned prior art is mounted in sliding rotatable manner in an inner ring, which in turn is designed for mounting in the casing unit in an outer ring. It is proposed, in the known example, to make the inner ring from an elastic plastic, and in addition to split it radially by a radial slot, so that slight radial forces will act between the mutually sliding bearing surfaces on the inside of the bearing opening and the outside of the steering spindle, so as to achieve the slightest possible sliding friction. In order to further reduce the bearing friction, it is furthermore proposed to use plastics with good sliding properties or to design the surfaces in a friction reducing manner. Thanks to these measures, an especially smooth mounting is realized with little frictional or damping torque.

However, too smooth a mounting opposing no perceptible resistance to a manual steering maneuver on account of the steering assist generally present in modern motor vehicles produces an unpleasant steering feel. Therefore, a dampening is desirable for a pleasant and high-quality haptics in which a defined, uniformly gently sliding braking torque opposes a turning of the steering spindle. But this cannot be provided by means of the known mounting, which is optimized for slight bearing friction.

In view of the issues discussed above, one problem which the present invention proposes to solve is to indicate a plain bearing by which a defined uniform braking torque can be set, and which can be easily modified for different requirements.

PRESENTATION OF THE INVENTION

This problem is solved by a plain bearing with the features of claim 1 and a steering column according to claim 11. Advantageous modifications will emerge from the dependent claims.

According to the invention, it is proposed for a plain bearing of this kind for a steering spindle of a steering column for a motor vehicle, having an inner ring with an axially continuous bearing opening for slidably receiving the steering spindle, that a prestressing device is in operative connection with the inner ring, exerting on the inner ring a prestressing force that squeezes together the bearing opening, for the clamping of the inner ring on the steering spindle, wherein the prestressing device comprises an adjusting device for the variable setting of the prestressing force.

The plain bearing according to the invention comprises a prestressing device, which interacts with the inner ring. The prestressing device comprises at least one force generating means, which generates a prestressing force acting on the inner ring in the direction of reducing the bearing cross section of the bearing opening and thereby squeezing the inner ring together. The prestressing force is applied to the inner ring in such a way that the inner wall of the bearing opening, which forms the bearing surface for the inner ring, is loaded in the direction of a narrowing of the bearing opening. The application of a defined prestressing force to the inner ring by means of the prestressing element according to the invention may thus bring about a clamping of the inner ring on the steering spindle mounted in the bearing opening.

The clamping of the inner ring on the steering spindle has the effect that the bearing surface of the inner ring is pressed with a defined prestressing force against the bearing surface of a steering spindle mounted in the inner ring. The size of the prestressing force determines the magnitude of the frictional force occurring between the mutually sliding bearing surfaces, which opposes a rotation of the steering spindle in the inner ring of the plain bearing when a steering torque is manually applied, as a damping or braking torque. Thanks to the prestressing element, the bearing friction of the plain bearing can be easily set in a targeted manner by setting the prestressing force, in order to generate a noticeable countertorque during a steering process, which is perceived as being pleasant.

The adjusting device enables the changing of the prestressing force introduced by the force generating means in the inner ring. An adjustable prestressing device with variable prestressing force is realized. For example, the clamping device may have a clamping member as the force generating means, which engages on the inner ring to apply a tensile or compressive force pushing the bearing opening together, and which can be changed by means of suitable actuating means.

Thanks to the invention, a structural element present in a steering column, namely the plain bearing, can be given an additional function, namely, a damping or braking action, which enables an optimization of the haptics. The additional functionality can be realized with little expense. One benefit is that the damping action is not established during the fabrication of the inner ring, but instead it can be individually adjusted and adapted only before or during the installation in a steering column by means of the adjusting device. In this way, it is possible to provide a different steering feel adapted to a particular vehicle type with a single design of a plain bearing. Furthermore, it is possible to cancel out tolerance-related fluctuations in the bearing friction and thus the damping by adjusting the adjusting device and thereby improve the reproducibility.

The size of the prestressing force can be set in defined manner by the prestressing element, regardless of the inner ring. In this way, it is possible for example to employ the inner ring made from a material with suitable bearing and sliding properties and good long-term stability, even though the elasticity and mechanical stability is too low to set a bearing friction needed to generate the optimal damping or braking action. Thanks to the design of the prestressing device, a prestressing force can be set which is adapted to the particular use, so that different haptic properties of a steering column can be produced with an inner ring.

It may be provided that the inner ring has a radial slot between oppositely facing (free) circumferential ends in the circumferential direction, with which the prestressing device engages and exerts the prestressing force in the circumferential direction.

The inner ring in this embodiment is split, and thus formed substantially open in C-shape, with free circumferential ends bounding the slot in the circumferential direction. Such a design is already known in principle from the previously mentioned prior art and has the benefit of easy mountability on the steering spindle. However, the known inner ring can only rest with very slight radial force against the bearing surface of the steering spindle, so that the setting of a defined, sufficiently large damping or braking torque is not possible. According to the invention, the prestressing device is mounted on the open inner ring in such a way that it engages the free circumferential ends and pulls them toward each other with the prestressing force in the circumferential direction and consequently acts to narrow the width of the slot. In this way, the inner ring is pulled together in the manner of a pipe clip, and the prestressing force introduced by the prestressing device in the circumferential direction into the inner ring is diverted into a radially inward directed force, which squeezes the bearing opening together. One benefit is the large force transmission, so that a relatively small prestressing force exerted by the prestressing device in the circumferential direction is converted into a relatively large radial force with which the bearing opening of the inner ring on the steering spindle can be braced.

Thanks to the adjusting device, the prestressing force acting between the free circumferential ends can be variably adjusted. By the variable setting of the relative force pulling together the circumferential ends in the direction of a narrowing of the slot width in the circumferential direction, the bearing opening is accordingly radially squeezed together, so that as a result the clamping of the inner ring on the steering spindle is variably adjustable.

A further benefit is that, thanks to the prestressing device, the inner ring initially open due to the slot becomes closed in the circumferential direction, so that a closed ring-shaped structure is formed, which increases the rigidity of the bearing assembly formed from the steering spindle and the inner ring as compared to the prior art. The increased rigidity and the resulting higher eigenfrequency improve the mechanical operating properties of a steering column outfitted with such a plain bearing.

A C-shaped inner ring with a radially continuous slot can be fabricated with little expense as an injection molded plastic part.

The adjusting device may comprise an adjusting drive. The adjusting drive may preferably comprise a screw drive. An adjusting drive has gearing means interacting with each other, which upon activation are movable relative to each other for the adjustment, so as to generate the prestressing force. In the prestressing device according to the invention, the adjusting drive serves as the force generating means, which engages with the inner ring such that the bearing opening can be squeezed together by an activation of the adjusting drive. An adjusting drive for example can be arranged on a C-shaped inner ring, bridging over the slot, and engaging with the circumferential ends so that its activation brings about a change in the slot width, thereby adjusting a variable prestressing force. In other words, thanks to the adjusting drive it is possible to adjust the prestressing force continuously.

In one advantageous design, the adjusting drive may comprise a screw drive with an adjusting screw which can be screwed into a spindle nut. Because the spindle nut is connected firmly and rotationally fixed in the circumferential direction to one circumferential end, and the adjusting screw is braced rotatably about its screw axis situated parallel to the circumferential direction and firmly in the circumferential direction against the other circumferential end, a rotation of the adjusting screw has the effect that the circumferential ends—depending on the direction of turning of the adjusting screw—are moved toward or away from each other in the circumferential direction. Accordingly, an increasing of the prestressing force produces a setting designed to decrease the slot width, and vice versa the prestressing force can be reduced by turning the adjusting screw in the opposite direction. The setting can be done by manual turning of the adjusting screw, screwing it in until the required prestressing force is set in order to achieve the desired damping. The setting can be done in advance, before the bearing is mounted, or also in the installed position, so that it can be adjusted against the actually measured damping torque of the steering spindle.

Alternatively or additionally, a different design of an adjusting drive can be used, such as an eccentric mechanism, a spline gearing, or the like.

Preferably, the adjusting device may have a fixed design. In this way, a setting of the prestressing force once adjusted can be fixed in place. In order to accomplish this, the force generating means may be self-locking, for example, in an adjusting drive designed as a screw drive. Alternatively, a force locking, form fit and/or material bonded fixation of the setting can be done, for example, by caulking, wedging or gluing the adjusting drive in the set position.

One advantageous embodiment of the invention calls for the prestressing device to comprise a spring element, which is arranged in the flow of force of the prestressing force. For this, the spring element may be arranged between the adjusting device and the inner ring.

By a clamping or bracing of the spring element on the adjusting device, the elastic spring force acting as a counter force may be channeled as a static, elastic prestressing force into the inner ring. With the adjusting device, the elastic clamping of the spring element can be increased or decreased in order to set the prestressing force which can be transmitted via the spring element to the inner ring. The elastic coupling achieved in this way has the benefit that the adjustment range of the prestressing force effectively acting on the inner ring can be set by the clamping of the spring element, so that for example when the adjusting device is at maximum relaxation the spring element can still exert a minimum prestressing force on the inner ring. Conversely, it can be ensured that, when the adjusting device is at maximum tension, the prestressed spring element will not exceed a maximum prestressing force. Furthermore, the spring element offers the possibility of reducing fluctuations of the braking torque on account of a present concentricity deviation of the steering spindle in the area of the plain bearing.

A spring element may be arranged between a variable adjusting drive of the adjusting device and the inner ring, so that it can be pretensioned in various ways by adjusting of the adjusting drive. It is likewise possible for the prestressing force to be set by the spring element optionally engaging with the inner ring at different engaging portions, wherein the spring element is optionally under elastic pretensioning to different degrees. The adjusting of the adjusting device is then done by installing, clamping or bracing the spring element in different installation positions on the inner ring, where it is under elastic pretensioning to different degrees.

A spring element with small dimensions can be provided from spring steel, with which a sufficiently large prestressing force can be provided. In this way, an easy integration in a plain bearing can be accomplished. A further benefit is that spring steel retains its elastic properties for a long time and ensures a uniform prestressing force and accordingly a uniform damping and sliding behavior over the entire lifetime of the steering column.

The prestressing device may comprise two clamping legs spaced apart in the circumferential direction, which are connected to the circumferential ends. The clamping legs are arranged in opposite facing pairs in the circumferential direction and extend in the area of the circumferential ends transversely to the circumferential direction, i.e., substantially radially or axially. In this way, the prestressing device is clamp-shaped, U-shaped or C-shaped or stirrup-shaped. The clamping legs may respectively engage in a form fitting manner in axial or radial recesses, which are formed on the inner ring in the area of the circumferential ends, or engage behind axially or radially protruding projections and become braced against them. A clamping leg can be inserted respectively in the recesses, so that the prestressing device spans the slot, and a form fit is produced for the inner ring in the circumferential direction.

The adjusting device can be arranged between the clamping legs. The clamping legs are joined together across the adjusting device in the circumferential direction. The prestressing force transmitted from the clamping legs to the inner ring, which for example loads the mutually opposite free circumferential ends in the gap against each other in the circumferential direction, can be changed and set by making the distance between the legs larger or smaller in the circumferential direction, for example by means of an adjusting drive, as described above. In this way, the clamping legs, and the circumferential ends connected to them, can be loaded against each other with a larger or smaller prestressing force in the circumferential direction.

In one advantageous modification, the clamping legs have spring elements or are themselves configured as spring elements. For example, the spring elements may have a bending elastic design due to having leaf springs installed. An elastic prestressing force can be exerted on the inner ring across the free ends of these spring elements, which is greater as the distance between the clamping legs is set more narrow. Alternatively or additionally, a spring element may be integrated between the adjusting drive, or arranged between the adjusting drive and one or both clamping legs.

An alternative embodiment calls for the adjusting device to comprise at least two different pairs of engaging portions on the inner ring, between which the prestressing device can be mounted. Force application points at which the prestressing force is introduced into the inner ring are located in the engaging portions. For example, the above-described recesses, openings or projections may comprise the engaging portions at which the clamping legs are braced by their free ends in a form fitting manner in the circumferential direction in order to exert a relative prestressing force in the circumferential direction on the circumferential ends. To realize an adjusting device, for example a first pair of engaging portions may have a first, smaller spacing in the circumferential direction, and a second pair of engaging portions a second, larger spacing in the circumferential direction. Now, when a pair of elastic clamping legs of the prestressing device is brought into engagement with the second engaging portions, spaced apart by a greater distance, the clamping legs will be further curved away from each other in the circumferential direction than if they engage in the first, more closely spaced engaging portions. Consequently, the clamping legs when mounted at the second engaging portions exert a greater prestressing force on the inner ring than when mounted at the first engaging portions. In this way, by moving the spring element between different engaging portions, the prestressing force can be adjusted. Thus, with the displacement of the spring element, the setting of the prestressing force is done continuously or in discrete steps.

In the last described embodiment, the adjusting device according to the invention is realized by the interaction of spring elements with different engaging portions on the inner ring. A spring element can thus be fashioned in U-shape or C-shape as a spring clip, comprising the two clamping leg. Alternatively or additionally, an adjusting drive or the like can be provided, with which the spacing of the clamping legs can be adjusted.

Instead of the described two pairs of engaging portions, three or more different pairs may also be provided, in order to make possible a more finely stepped adjustment of the prestressing force. Alternatively or additionally, the pairs of engaging portions may also differ in their radial positioning on the inner ring. As regards the squeezing of the bearing opening, a leverage with different force transmission ratios can be generated in this way, so that a different prestressing force can likewise be generated with the same spring element.

A spring element for the forming of a clamping leg may be fashioned as an elongated leaf spring, or as a U-shaped or C-shaped or stirrup-shaped part to form a spring clip, which can be produced especially rationally and with the required elastic properties as a bent or bent and stamped part of spring steel wire or plate.

The prestressing device may comprise a preferably single piece of molded sheet metal, having a plurality of functional elements of the prestressing device and comprising the adjusting device. The molded sheet metal piece can be especially rationally fabricated as a pressed, stamped and bent part, for example from spring steel plate. An adapted shaping can be realized with little expense, comprising for example both clamping legs, spring elements, abutments and thread of a screw drive of the adjusting device in a single structural part.

The inner ring may be formed of plastic, preferably as an injection molded plastic part. The use of plastics for the inner ring of the plain bearing has the advantage that, together with the steering spindle normally made of steel or aluminum alloy, a long-lasting low-wear and reliable bearing pairing is possible. Thanks to the choice of suitable plastics, the desired sliding properties can be dictated within broad limits, for example in order to lessen undesirable static friction ("stick-slip") effects, or to increase or decrease the friction deliberately by the addition of additives. Fabrication as an injection molded plastic part from a thermoplastic elastomer can be done rationally in the most diverse of configurations, optimally suited to the respective use. Thanks to the prestressing element according to the invention, the frictional effects needed for the desired damping or braking action can be established largely regardless of the elastic properties of the plastic. For example, a low-friction sliding, mechanically resistant, yet flexurally soft or less elastic plastic can be radially pressed by the additional prestressing element according to the invention with correspondingly large prestressing force against the bearing surface of the steering spindle in order to generate a defined bearing friction corresponding to the desired braking or damping torque. Likewise, different pairs of engaging portions can be easily formed on the inner ring.

Regarding the mounting, it is advantageous that the initially still open split inner ring can be easily mounted under elastic bending in the axial direction onto a steering spindle, and the actual clamping occurs only by axial inserting of the spring clip in the inner ring. Alternatively, it is possible to first install the prestressing element, and then place the inner ring on the steering spindle.

A further benefit of the clamp-like design of the prestressing element, besides the small structural shape and the easy integration in an existing bearing concept of a plain bearing, is that due to the material thickness of the spring steel wire or plate the elastic properties and the size of the prestressing force can be changed and adapted with little expense.

Alternatively, it is conceivable to provide other fastening means, preferably by mutually corresponding form fit elements on the inner ring and the prestressing element.

It may be provided that the inner ring is surrounded by an outer ring. The inner ring may be arranged substantially coaxially in a receiving opening inside the outer ring and be held therein. The outer ring can be mounted in the casing unit of a steering column.

One development may involve at least one radial compensation element being arranged between the inner ring and the outer ring. Because the compensation element has an elastic springy configuration in the radial direction, a radially resilient supporting or suspending of the inner ring in the outer ring can be realized by one or more compensation elements, so that the entire inner ring can be radially mounted inside the outer ring, in order to compensate for an offset between the steering spindle axis and the bearing axis, which may occur due to the aforementioned overdetermination in an arrangement with three bearings. The compensation elements may be for example resilient intermediate pieces made of elastic material arranged radially between inner and outer ring.

An elastic element such as an elastomer spring made of an elastically deformable profile of rubber-like material acting in the radial direction between inner and outer ring can be inserted as a compensation element. A compensation element can also be provided in that the inner ring is overmolded with a more elastic material. For this, the inner ring in a binary injection molding process can be encased on its outer circumference all around or for a portion with a resilient, soft, thermoplastic elastomer material.

The invention further relates to a steering column for a motor vehicle, having a rotatably mounted steering spindle, which is rotatably mounted in at least one plain bearing, having an inner ring with an axially continuous bearing opening slidably receiving the steering spindle, and surrounded by an outer ring, that the plain bearing comprises at least one prestressing device, which exerts a prestressing force on the inner ring and clamps the inner ring on the steering spindle, wherein the prestressing device comprises an adjusting device for the variable setting of the prestressing force.

The steering column may be designed as a non-adjustable or adjustable steering column. In an adjustable steering column, this may be designed as a manually adjustable steering column or a motorized adjustable steering column. Thus, the plain bearing according to the invention can be installed in different types of steering columns.

Thanks to the plain bearing being designed according to the above described embodiments, the prestressing force and thus the damping of the steering spindle can be variably adjusted.

FIG. 1 shows a steering column 1, with an actuator 2, having an inner casing tube 21, in which a steering spindle 22 is mounted rotatably about a longitudinal axis 23. At the rear end relative to the driving direction, facing toward the driver, the steering spindle 22 comprises a fastening section 24 for the mounting of a steering wheel, not shown. In its front region, the actuator 2 is received by the casing tube 21 in a casing unit 3, also known as a guide box. At the front end of the steering spindle 22, projecting to the front from the casing unit 3, there are formed fastening means 26 for connection to an intermediate shaft of the steering system, not shown.

For its mounting on a vehicle bodywork, not shown, the steering column 1 comprises a support unit 4 with fastening means 41. In the installed condition in the motor vehicle, these fastening means 41 are situated on top; for better clarity, the representation of FIG. 1 shows a view from front bottom.

The casing unit 3 is supported between two side cheeks 42, projecting downward on either side transversely to the longitudinal axis 23, i.e., projecting upward in the representation of FIG. 1. Through the side cheeks 42 there passes a tightening bolt 43 of a tightening device, which can be brought by manual activation of a clamping lever 45 connected to the tightening bolt 43 optionally into into a fixed or released position. In the fixed position, the side cheeks 42 are pressed against each other, so that the casing unit 3 is clamped by friction locking and fixed between the side cheeks 42, and the actuator 2 is clamped and fixed in the casing unit 3 by the clamping force acting on the casing unit 3. In the released position, the clamping is released by abolishing the clamping force between the side cheeks 42, and the casing unit 3 can be moved up or down between the side cheeks 42 in the height direction H for a height adjustment relative to the support unit 4, as indicated by the double arrow. For the lengthwise adjustment, the casing tube 21 of the actuator 2 can be moved forward or back in telescoping manner in the longitudinal direction L in the direction of the longitudinal axis 23 in the casing unit 3, as indicated by the double arrow.

The steering spindle 22 is generally mounted by means of roller bearings (not shown here) in the area of the rear end of the casing tube 21, and at its front end, which is received in the casing unit 3. In the front end region of the casing unit 3, a plain bearing 5 designed according to the invention is placed, mounting the steering spindle 22 rotatably in its front end region.

The plain bearing 5 comprises an outer ring 51, in which an inner ring 52 is arts ranged securely in regard to rotation about the longitudinal axis 23. FIG. 2 shows, in an enlarged detail representation, a side view of the bearing arrangement formed in the front end region of the steering spindle 22 together with the plain bearing 5. It can be seen from this that the steering spindle 22 comprises a bearing section 27, which is rotatably mounted by means of the plain bearing 5.

FIG. 3 shows an axial view from the front of the plain bearing 5 in the direction of the longitudinal axis 23, corresponding to a view from the left in FIG. 2, but without the steering spindle 22. It can be seen from this that the bearing section 27 of the steering spindle 22 is received in an axially continuous bearing opening 53 of the inner ring 52, so that the steering spindle 22 is mounted in sliding manner and rotatably about the longitudinal axis 23.

Figure 6:
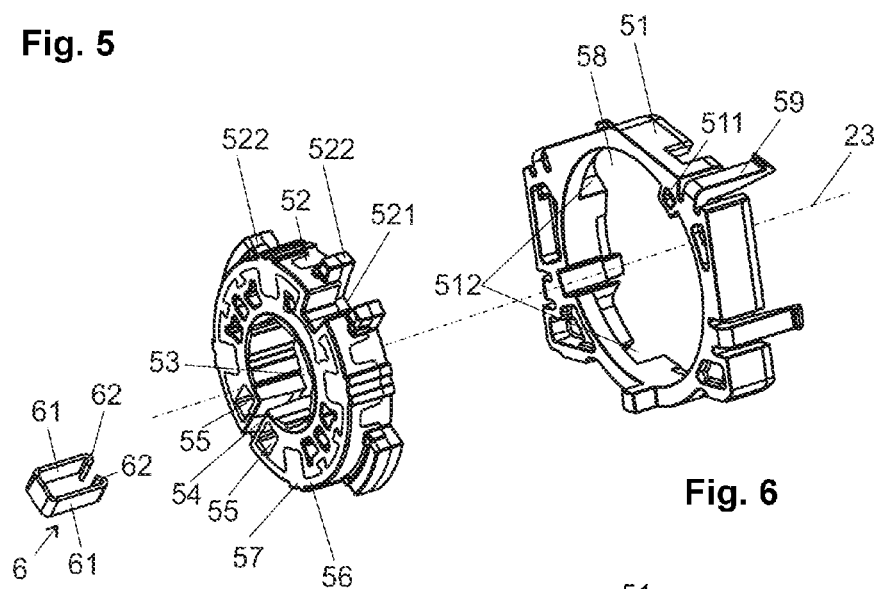
FIG. 6 is a perspective view of the plain bearing of FIG. 5 in a dismantled representation.

The plain bearing 5 shown in FIG. 3 is shown once more in FIG. 5 in a perspective representation, and in FIG. 6 in an exploded drawing dismantled in the longitudinal direction.

The inner ring 52 comprises the coaxial bearing opening 53, and is in turn arranged coaxially in a receiving opening 58 in the outer ring 51, as can be seen in FIG. 6. The inner ring is split in the circumferential direction by a radially continuous slot 54, so that it has a C-shaped cross section. The slot 54 is spanned in the circumferential direction by a prestressing element according to the invention, designed as a spring clip 6.

The spring clip 6 is substantially U-shaped with two legs 61, as can be seen in FIG. 6. These two legs engage in the axial direction in recesses 55 or enclose the recesses 55 by their legs 61, which pass through the inner ring 52 in the region of the mutually opposite ends at the slot 54. The spring clip 6 is preferably punched out from spring steel plate and bent, forming a spring elastic force transmission element by which a prestressing force V is generated, as shown schematically in FIG. 3. Through the recesses 55, this prestressing force V is channeled in the circumferential direction into the inner ring 51 in such a way that the mutually opposite free ends of the inner ring 52, facing each other in the slot 54 in the circumferential direction, are loaded against each other in the circumferential direction, i.e., pulled together. In other words, the prestressing force V acts to reduce the slot width. In this way, the inner ring 52 is pulled together in the fashion of a pipe clip, and the prestressing force V channeled by the spring clip 6 in the circumferential direction into the inner ring 52 is diverted into a radially inwardly directed force F, which pulls the bearing opening 53 together radially. Thanks to the radial force F, which is indicated in FIG. 3, the inner ring 52 is consequently braced by its bearing opening 53 on the bearing section 27 of the steering spindle 22.

The prestressing force V exerted by the spring clip 6 ensures a greater force F acting between the mutually sliding bearing surfaces of the bearing opening 53 and the bearing section 27. In this way, the sliding friction with regard to a rotation of the steering spindle 22 about the longitudinal axis 23 is deliberately increased, so that a damping torque opposes a manual steering maneuver. This damping or braking torque acts regardless of a possible auxiliary force assistance of the steering system, whereby a manually applied steering torque is assisted by a motor. Thanks to the design of the spring force of the spring clip 6, the prestressing force V and the resulting force F, which determines the amount of the friction and thus the damping action, can be adjusted in broad limits in order to generate the desired haptics and the steering feel.

At the free ends of the legs 61 there may be arranged barbed latching elements 62, which dig into the opposite end face of the inner ring 52 when the spring clip 6 is inserted into the recesses 55 opposite the axial adjusting direction and ensure a secure, form fitting attachment of the spring clip 6. The easy installation furthermore makes it possible to first place the inner ring 52 on the bearing section 27 of the steering spindle 22 and then to clamp the bearing opening 53 on the steering spindle 22 by axial inserting and locking of the spring clip 6. Alternatively, the spring clip 6 may be installed first, and then the inner ring 52 can be mounted in the axial direction on the bearing section 27 of the steering spindle 22. In any case, the spring clip 6 closes the slot 54 in the mounted state, so that the inner ring 52 takes on a closed ring shape, thereby achieving a better stability of the mounting and an improved eigenfrequency behavior.

The inner ring 52 is preferably fabricated as an injection molded plastic part made of thermoplastic polymer, whereby the complex shape of the inner ring 52 including the slot 54 and the recesses 55 can be easily realized.

One advantageous embodiment calls for the inner ring 52 to comprise an overmolding 56 of a rubber elastic elastomer, which can be rationally mounted in the binary injection molding process. Compensation elements 57 projecting radially outward can be formed from this elastic material, which are braced radially from the inside against the inside of the receiving opening 58, and which allow an offset of the steering spindle 22 together with the inner ring 52 in the outer ring 51 and absorb it in springlike manner.

Thanks to a form fit element in the shape of a lug 511 protruding radially inwardly from the outer ring and engaging in a form fitting manner in a corresponding recess 521 on the outside in the inner ring 52, a form fitting connection acting in regard to rotation about the longitudinal axis 23 is formed between the inner ring 52 and the outer ring 51. This ensures a firm fixation of the inner ring 52 in the outer ring 51.

In the embodiment represented in FIG. 6, the inner ring 52 comprises form fit elements 522 on its outer lateral surface, for example projections protruding radially outward, which engage in a form fitting manner in corresponding form fit elements 512 in the inner wall of the receiving opening 58 of the outer ring 51, which may be formed accordingly as indentations.

For its securing in the casing unit 3, the outer ring 51 comprises latching elements 59. These extend in the longitudinal direction and have barbed free ends, which snap into the casing unit 3 when inserted axially into corresponding latching openings 31 and secure the outer ring 51 in a form fitting manner in the longitudinal direction.

Figure 7:
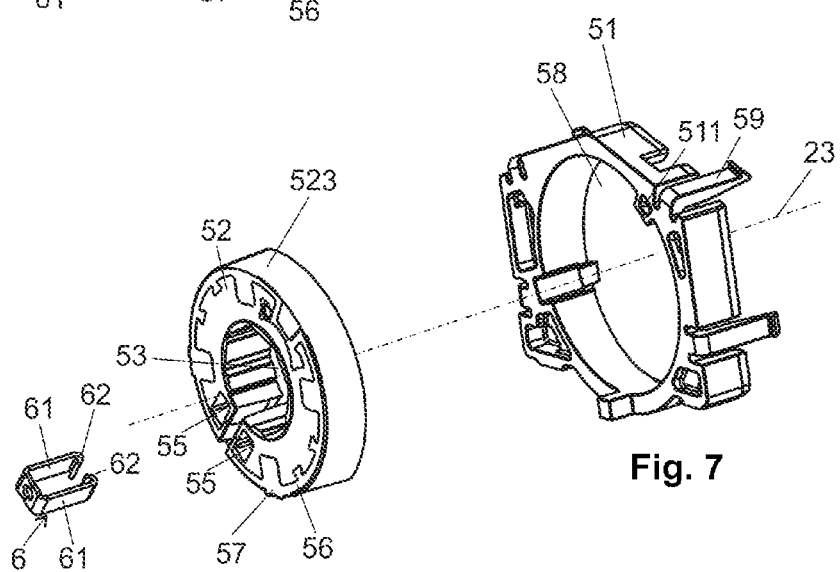
FIG. 7 is a perspective view of a further embodiment of a plain bearing in a dismantled representation as in FIG. 6.

FIG. 7 shows an alternative embodiment in which the inner ring 52 has a smooth, cylindrical or conical outer casing surface 523, which can be inserted and secured in a likewise internally smooth cylindrical or conical receiving opening 58 of the outer ring 51.

FIG. 4 shows a bearing arrangement of a steering spindle 22, where a spring elastic prestressing element 63 is arranged between the outer ring 51 and the inner ring 52, so that it exerts a prestressing force V as indicated in the radial direction from the outside on the inner ring 51. In this way, the latter is compressed such that it is pressed by the bearing surface of the bearing opening 53 with a radial force F against the bearing surface in the bearing section 27 of the steering spindle 22. This can likewise accomplish a controlled increased bearing friction and thus a damping action.

Figure 8:
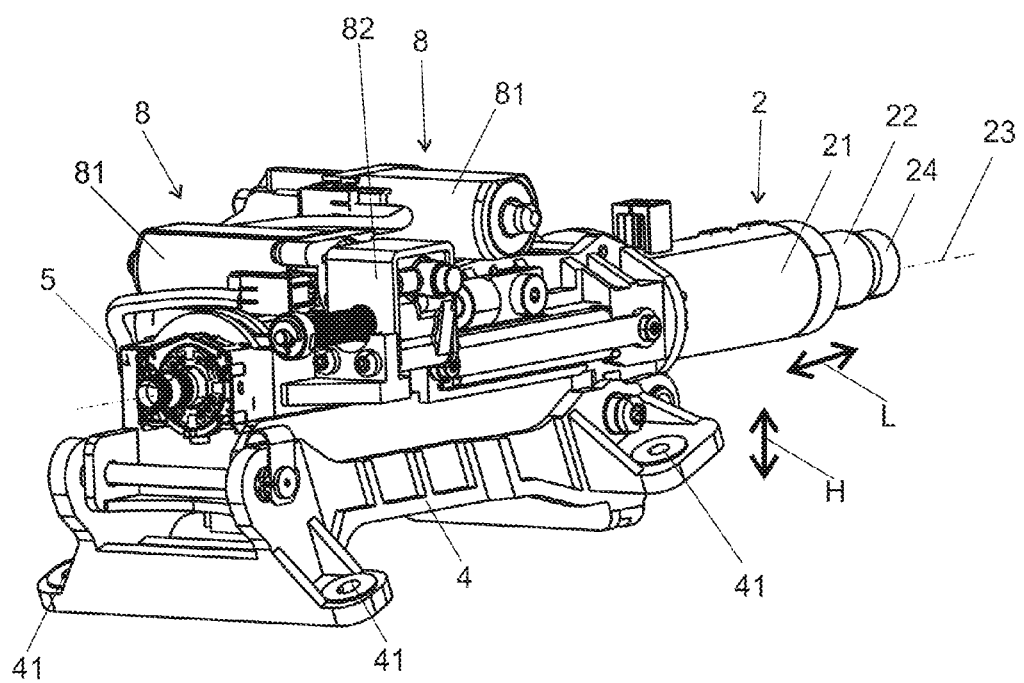
FIG. 8 is a perspective view of a second embodiment of a steering column similar to FIG. 1.

The embodiment of a steering column 1 shown in FIG. 8 has in place of the manual tightening device of the embodiment of FIG. 1 electrical adjusting drives 8, each having an electrical servomotor 81 and a spindle drive 82 driven therewith. One of the adjusting drives 8 is arranged between the support unit 4 and the casing unit 3 and make possible a motorized adjustment in the height direction H, the other adjusting drive 8 acts in the axial direction between the casing unit 3 and the actuator 2, so that a motorized length adjustment can occur in the longitudinal direction L.

A plain bearing 5 according to the invention can be used for this, as for the above described manually adjustable steering column 1.

Figure 9:
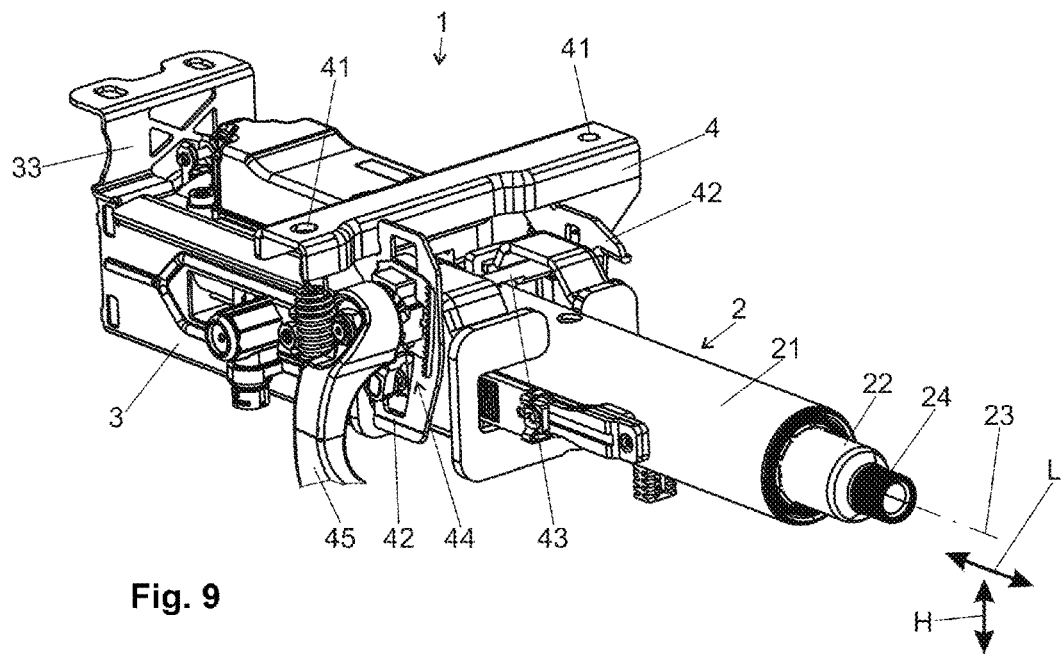
FIG. 9 is a schematic view of a steering column.
Figure 10:
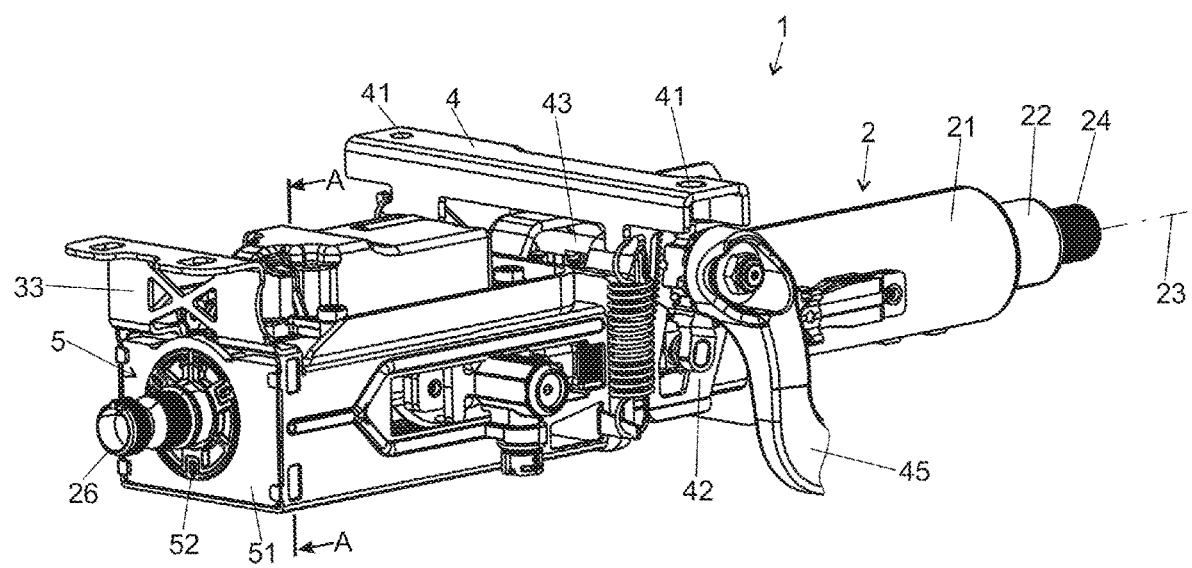
FIG. 10 is a schematic perspective view of the steering column per FIG. 9.
Figure 11:
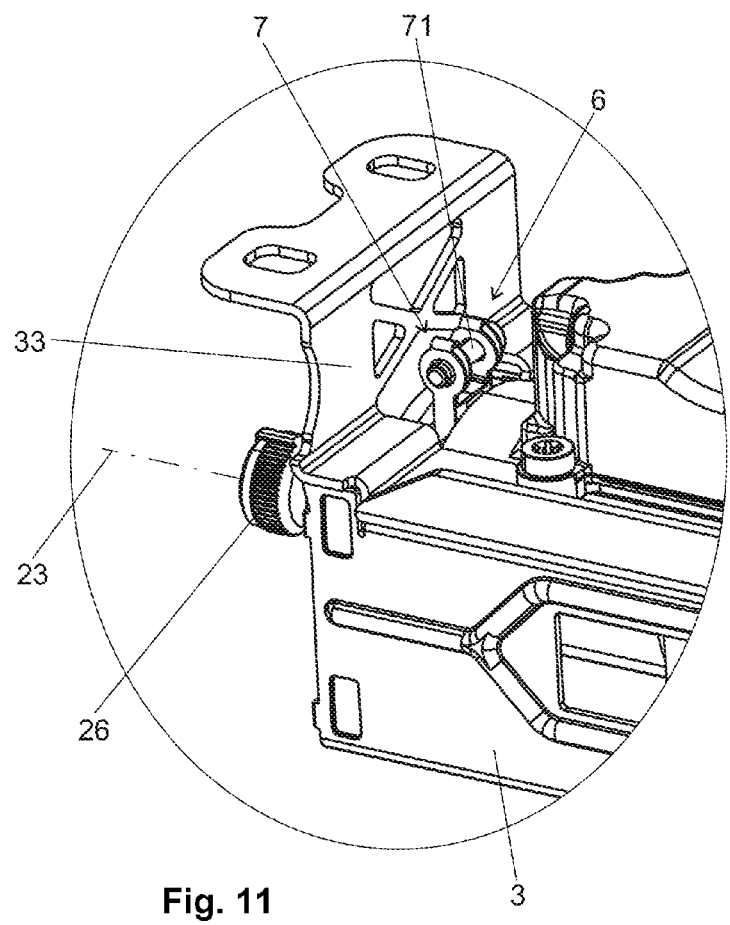
FIG. 11 is a schematic perspective detailed view of the steering column of FIG. 9.

FIGS. 9 and 10 show a steering column 1, with an actuator 2, having an inner casing tube 21, in which a steering spindle 22 is mounted rotatably about a longitudinal axis 23. At the rear end relative to the driving direction, facing toward the driver—looking toward the observer at bottom right in FIG. 9 and away from the observer at top right in FIG. 10—the steering spindle 22 comprises a fastening section 24 for the mounting of a steering wheel, not shown. In its front region, the actuator 2 is received by the casing tube 21 in a casing unit 3, also known as a guide box. At the front end of the steering spindle 22 in regard to the driving direction, projecting to the front from the casing unit 3, there are formed fastening means 26 for connection to an intermediate shaft of the steering system, not shown.

For mounting on a vehicle bodywork, not shown, the steering column 1 comprises a support unit 4 with fastening means 41. Furthermore, the casing unit 3 has a coupling section 33, which can be attached to the vehicle bodywork, not shown. The coupling section 33 is configured as a flexurally soft section which is elastically deformed to provide a height adjustment when the casing unit 3 is swiveled relative to the support unit 4.

The casing unit 3 is supported in the support unit 4 between two side cheeks 42, projecting downward on either side transversely to the longitudinal axis 23.

Through the side cheeks 42 there passes, transversely to the longitudinal axis 23, a tightening bolt 43 of a tightening device, having a tightening gearing 44, which can be brought by manual activation of a clamping lever 45 connected to the tightening bolt 43 optionally into a fixed or released position. In the fixed position, the side cheeks 42 are pressed against each other by the tightening gearing 44, so that the casing unit 3 is clamped by friction locking and fixed between the side cheeks 42, and the actuator 2 is clamped and fixed in the casing unit 3 by the clamping force acting on the casing unit 3. In the released position, the clamping is released by abolishing the clamping force between the side cheeks 42, and the casing unit 3 can be moved up or down between the side cheeks 42 in the height direction H for a height adjustment relative to the support unit 4, as indicated by the double arrow. For the lengthwise adjustment, the casing tube 21 of the actuator 2 can be moved forward or back in telescoping manner in the longitudinal direction L in the direction of the longitudinal axis 23 in the casing unit 3, as indicated by the double arrow.

The steering spindle 22 is generally mounted by means of roller bearings (not shown here) in the area of the rear end of the casing tube 21, and at its front end, which is received in the casing unit 3. In the front end region of the casing unit 3, a plain bearing 5 designed according to the invention is placed, mounting the steering spindle 22 rotatably in its front end region in the casing unit 3. The plain bearing 5 is shown in an axial cross sectional view in FIG. 12, as well as individually in a perspective view in the mounted state in FIG. 13 and in a dismantled exploded view in FIG. 14.

The plain bearing 5 comprises an outer ring 51, having a rectangular outer cross section in the example shown, by which it is secured in a form fitting manner in the rear end region of the casing unit 3. In the outer ring 51 there is arranged an inner ring 52 which is secured in regard to rotation about the longitudinal axis 23. As a rotation lock, the inner ring 52 has form fit elements 5210 protruding radially outward with respect to the longitudinal axis 23, which engage in a form fitting manner in corresponding recesses 5110 of the outer ring 51.

The inner ring 52 has an axially continuous bearing opening 53, in which the steering spindle 22 is mounted in sliding and rotatable manner about the longitudinal axis 23 (in a bearing section 27).

Figure 12:
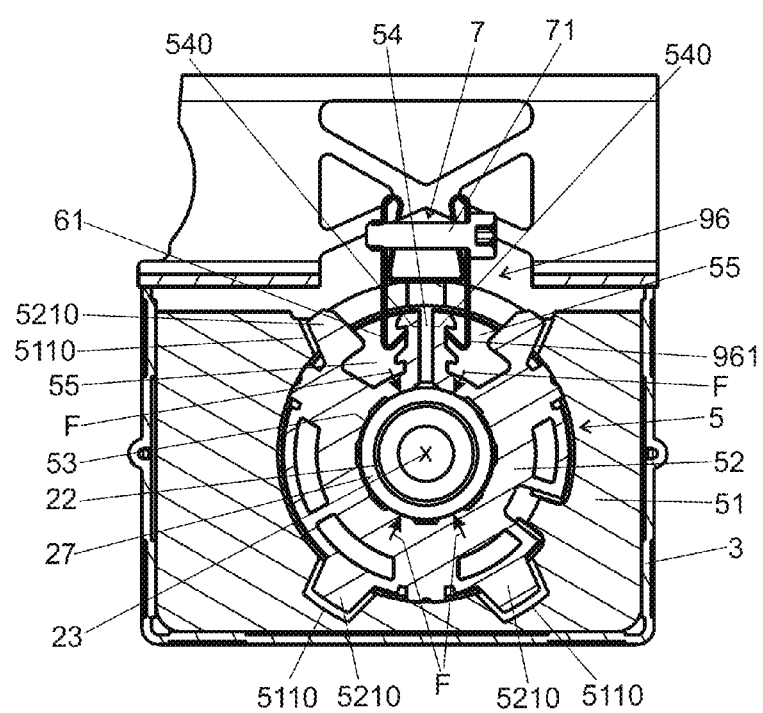
FIG. 12 is a cross-section A-A through the steering column of FIGS. 9 to 3 in the area of the plain bearing.
Figure 13:
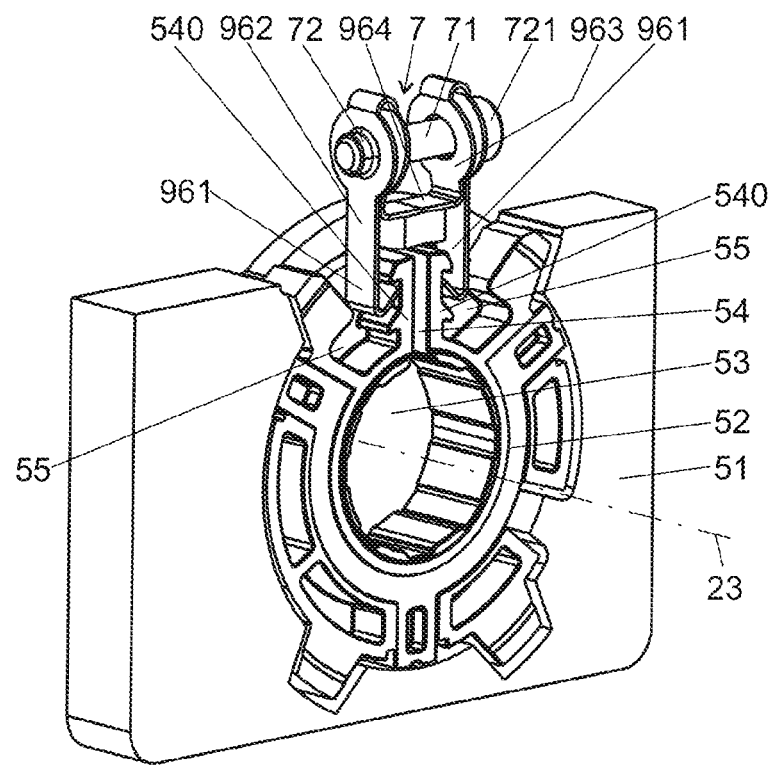
FIG. 13 is a separate perspective view of the plain bearing of FIG. 12.
Figure 14:
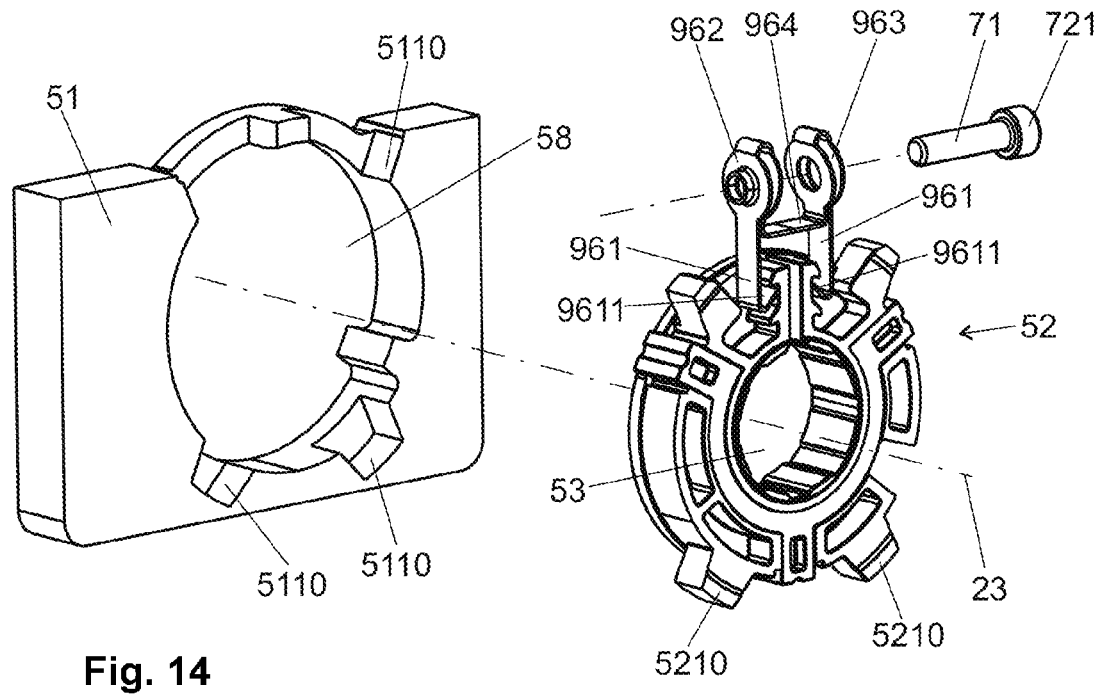
FIG. 14 is a dismantled view of the plain bearing of FIG. 13.

The inner ring 52, which comprises the coaxial bearing opening 53, is in turn arranged coaxially in a receiving opening 58 in the outer ring 51, as can be seen in FIGS. 12, 13 and 14.

The inner ring 52 is split by a radial slot 54, so that it has a C-shaped cross section. In the slot 54, the free circumferential ends 540 of the inner ring 52 lie against each other in the circumferential direction. In the circumferential direction, the slot 54 is spanned by a prestressing device 96 according to the invention.

Figure 17:
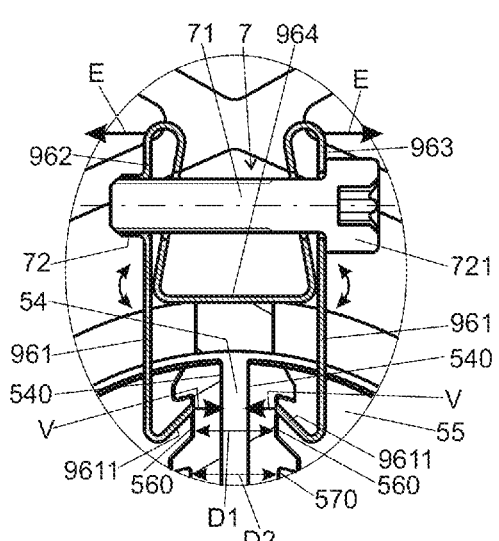
FIG. 17 is an enlarged view of the prestressing device of FIGS. 11 to 14.

FIG. 17 shows the prestressing device 96 of FIG. 14 in enlarged representation. The prestressing device 96 comprises two clamping legs 961, which face each other in the circumferential direction and are oriented with their free ends 9611 substantially radially inward toward the longitudinal axis 23. The free ends 9611 are curved in a barbed manner toward their mutually facing side in the circumferential direction.

By an adjusting device 7 according to the invention, the clamping legs 961 are joined together. The adjusting device 7 comprises a first clamping lever 962 and a second clamping lever 963, forming radial prolongations of the two clamping legs 961. An adjusting screw 71 is rotatably led through an opening in the second clamping lever 963, being braced by its head 721 against the clamping lever 963 and being screwed into the internal thread of a spindle nut 72 formed on the first clamping lever 962. The thread of the adjusting screw 71 and the spindle nut 72 is preferably configured as a metric standard thread or as a metric fine thread. In the region in which the clamping levers 962 and 963 pass into the clamping legs 961, there is arranged a supporting element 964 between the clamping levers 962 and 963, so that the first clamping lever 962 together with the one clamping leg 961 and the second clamping lever 962 together with the other clamping leg 961 respectively form a double-arm lever, which is mounted in rocker arm manner about the supporting element 964, as indicated by the curved arrows.

The adjusting screw 71 forms together with the spindle nut 72 an adjusting drive acting on the clamping levers 962 and 963, namely, a spindle drive. For the adjusting by unscrewing the adjusting screw 71 from the spindle nut 72, the clamping levers 962 and 963 are spread apart in the circumferential direction, i.e., moved away from each other in the circumferential direction, as indicated with the arrows E. In this way, the free ends 9611 of the clamping legs 961 are moved toward each other via the lever coupling, as indicated with the arrows V. If the adjusting screw 71 is turned in the reverse direction, it will be screwed out from the spindle nut 72, the clamping levers 962 and 963 will be pulled together in the circumferential direction opposite the arrow direction E, and accordingly the clamping legs 961 will be moved apart opposite the arrow direction V.

The two clamping legs 961 and the clamping levers 962 and 963 are formed together with the supporting element 964 as a single stamped and bent piece of a spring steel segment in the embodiment shown, and the spindle nut 72 is likewise formed as a single piece. Only the adjusting screw 71 is mounted as a single separate part on the prestressing device 96. In this way, a rational production can occur and good functional safety is achieved. A further benefit is that the clamping legs 961 can be formed as spring elements in the form of leaf springs, so that the free ends 9611 are elastically deformable with respect to each other in the circumferential direction, in and against the arrow direction V. Because these spring elements are arranged between the adjusting device 7 and the free ends 9611, they are in the flow of force between the adjusting device 7 and the inner ring 52.

The inner ring 52 comprises radial recesses 55, which are formed on the outside in the region of the circumferential ends 540. The clamping legs 961 engage radially from the outside with these recesses 55, while the free ends 9611 contact engaging portions 560 arranged in pairs in the circumferential direction. The two engaging portions 560 form surface sections facing away from the slot 54 in the circumferential direction, having a spacing of D1 from each other when the steering spindle 22 is received in the bearing opening 53.

Because the adjusting screw 71 is unscrewed so far from the spindle nut 72 that the ends 9611 have a spacing from each other which is smaller than the spacing D1 of the engaging portions 560, the clamping legs 961 exert a prestressing force V on the engaging portions 560 by means of the ends 9611, which is correlated with the above described arrow direction V during the pretensioning. The magnitude of the prestressing force V can be made larger by spreading the clamping levers 962 and 963 further apart by turning the adjusting screw 71. On the contrary, the pretensioning can be made smaller by bringing the clamping levers 962, 963 closer together.

Through the engaging portions 560, the prestressing force V is channeled in the circumferential direction into the inner ring 51 in such a way that the mutually opposite free circumferential ends 540 of the inner ring 52, facing each other in the slot 54, are loaded against each other in the circumferential direction, i.e., pulled together. In other words, the prestressing force V acts to reduce the slot width. In this way, the inner ring 52 is pulled together in the fashion of a pipe clip, and the prestressing force V channeled by the clamping leg 961 in the circumferential direction into the inner ring 52 is diverted into a radially inwardly directed force F, which pulls the bearing opening 53 together radially. Thanks to the radial force F, which is indicated schematically in FIG. 12, the inner ring 52 is braced by its bearing opening 53 on the steering spindle 22, so that a press fit is formed between the inner ring 52 and the steering spindle 22.

The prestressing force V exerted by the prestressing device 96 ensures a greater force F acting between the mutually sliding bearing surfaces of the bearing opening 53 and the bearing section 27. In this way, the sliding friction with regard to a rotation of the steering spindle 22 about the longitudinal axis 23 is deliberately increased, so that a damping torque opposes a manual steering maneuver. This damping or braking torque acts regardless of a possible auxiliary force assistance of the steering system, whereby a manually applied steering torque is assisted by a motor. Thanks to the setting of the adjusting device 7 of the prestressing device 96, the prestressing force V and the resulting force F, which determines the amount of the friction and thus the damping action, can be adjusted continuously in order to generate the desired haptics and the steering feel.

A changed setting of the prestressing force can also be done by changing the force channeling of the ends 9611 into the inner ring 52. As shown in FIG. 17, a further pair of engaging portions 570 can be provided, which may have a spacing D2 from each other which is different from the spacing D1, and they may have a different radial position, somewhat further to the inside, as in FIG. 17. By attaching the ends 9611 at these engaging portions 570, with otherwise identical setting of the prestressing device 96, corresponding to the same setting of the adjusting device 7, a different prestressing force can be generated and exerted. To accomplish this, a prestressing device (not shown) should be provided, in which the supporting section 964 is arranged closer to the adjusting screw 71. The rest of the configuration of the prestressing device is identical to the prestressing device 96 interacting with the first engaging portions 560, as represented in FIGS. 12 to 14 and FIG. 17.

Figure 15:
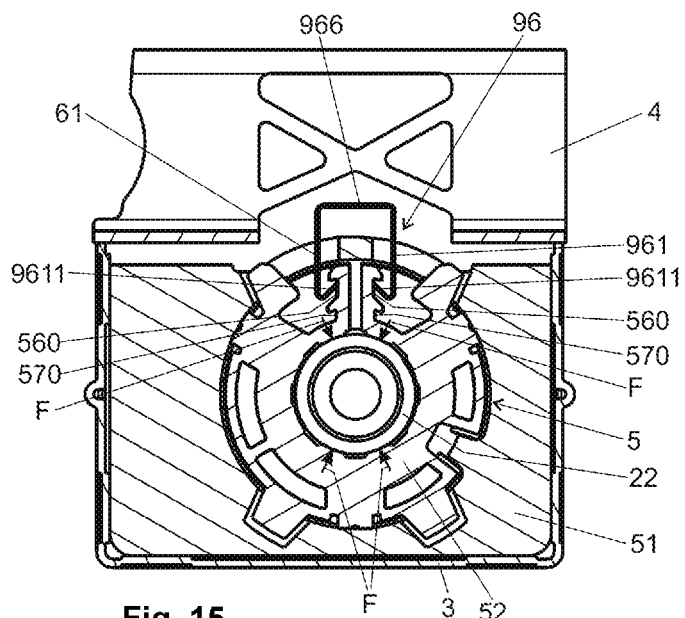
FIG. 15 is a cross-sectional view of a second embodiment of a plain bearing as in FIG. 12 in a first setting.
Figure 16:
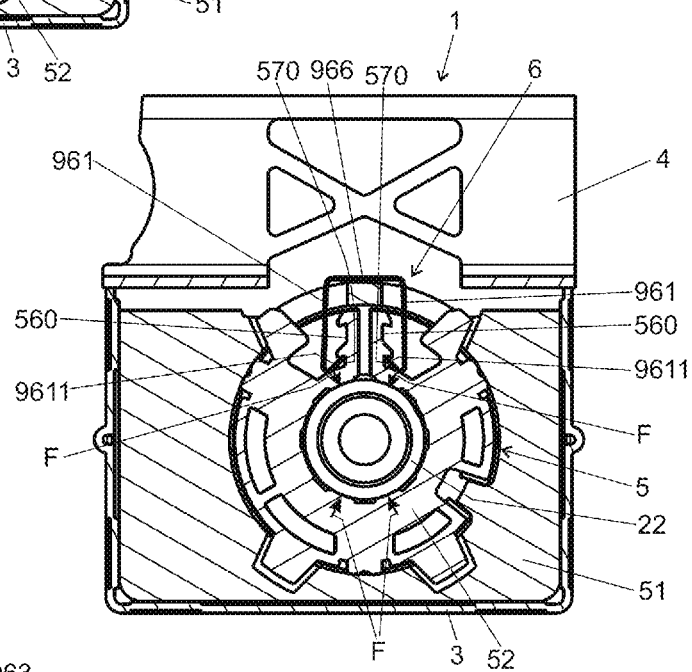
FIG. 16 is a cross-sectional view of the second embodiment per FIG. 15 in a second setting.

The last described interaction for the setting of the prestressing force is utilized in a second embodiment, which is represented in FIGS. 15 and 16 in a view similar to FIGS. 12 and 17 in two different settings.

The adjusting device is realized by the interaction of a stirrup-shaped, preferably single-piece spring element 966 with different engaging portions 560, 570, as described above. The spring element 966 has clamping legs 961, such as the first embodiment described above, but unlike this it has no adjusting drive 7. The setting of the prestressing force can be done simply by attaching the ends 9611 of the clamping legs 961 either to the pair of the first engaging portions 560, as in FIG. 15, or moved radially to the pair of the second engaging portions 570, as in FIG. 16.

Thanks to the barbed configuration, the free ends 9611 of the clamping leg 961 dig in when the spring clip 96 is inserted into the recesses 55 and ensure a secure, form fitting attachment of the prestressing device 96 or the spring element 966. In the mounted state, the slot 54 is bridged by the prestressing device 96 or the spring element 966, so that the inner ring 52 takes on a closed ring shape, by which a greater stability of the mounting and an improved eigenfrequency behavior are achieved.

The inner ring 52 is preferably fabricated as an injection molded plastic part made of thermoplastic polymer, whereby the complex shape of the inner ring 52 including the slot 54 and the recesses 55, optionally with the different engaging portions 560 and 570, can be easily realized. Most especially preferable, the inner ring 52 is formed from a polyoxymethylene with carbon fibers. The carbon fibers offer the benefit of lubrication and noise reduction.

One advantageous embodiment calls for the inner ring 52 to comprise an overmolding of a rubber elastic elastomer, which can be rationally mounted in the binary injection molding process. Compensation elements projecting radially outward can be formed from this elastic material, which are braced radially from the inside against the inside of the receiving opening 58, and which allow an offset of the steering spindle 22 together with the inner ring 52 in the outer ring 51 and absorb it in springlike manner.

One embodiment of a steering column 1 not shown here comprises, in place of the manual clamping device with the manual clamping lever 45 of the embodiment in FIG. 9, electrical adjusting drives, each having an electrical servomotor and a spindle drive driven therewith. One of the adjusting drives can be arranged between the support unit 4 and the casing unit 3 and make possible a motorized adjustment in the height direction H, the other adjusting drive 8 may be arranged in the axial direction between the casing unit 3 and the actuator 2, so that a motorized length adjustment can occur in the longitudinal direction L. A plain bearing 5 according to the invention can be used for this, as for the above described manually adjustable steering column 1.

LIST OF REFERENCE NUMBERS

1 Steering column
2 Actuator
21 Casing tube
22 Steering spindle
23 Longitudinal axis
24 Fastening section
26 Fastening means
27 Bearing section
3 Casing unit
31 Latching openings
4 Support unit
41 Fastening means
42 Side cheeks
5 Plain bearing
51 Outer ring
511 Lug
5110 Recess
512 Form fit element
52 Inner ring
521 Recess
5210 Form fit element
522 Form fit element
523 Outer casing surface
53 Bearing opening
54 Slot
55 Recesses
56 Overmolding
560, 570 Engaging portions
57 Compensation element
58 Receiving opening
59 Latching element
6 Spring clip (prestressing element)
61 Leg
62 Latching elements
63 Prestressing element
7 Adjusting device
71 Adjusting screw
72 Spindle nut
721 Head
8 Adjusting drive
81 Servomotor
82 Spindle drive
560, 570 Engaging portions
96 Prestressing device
43 Tightening bolt
45 Clamphing lever.
961 Clamping leg
9611 Ends 962, 963 Clamping lever
964 Supporting element
966 Spring element
V Prestressing force
F Force
D1, D2 Distance

What is claimed is:

1. A plain bearing for a steering spindle of a steering column for a motor vehicle, comprising:
    an inner ring with an axially continuous bearing opening configured to slidably receive the steering spindle, wherein the inner ring comprises a radial slot defined by oppositely facing circumferential ends in a circumferential direction; and
    a prestressing element configured to exert a prestressing force on the inner ring by engaging with the circumferential ends, to clamp the inner ring on the steering spindle.

2. The plain bearing of claim 1, wherein the inner ring is an injection molded plastic part.

3. The plain bearing of claim 1, wherein the the prestressing element bridges over the radial slot and narrows the radial slot in the circumferential direction.

4. The plain bearing of claim 3, wherein the prestressing element is configured as a clamp and is connected in the axial direction to the inner ring.

5. The plain bearing of claim 1, further comprising an outer ring surrounding the inner ring.

6. The plain bearing of claim 5, further comprising a radial compensation element disposed between the inner ring and the outer ring.

7. The plain bearing of claim 6, comprising an elastic material overmolded over the inner ring.

8. The plain bearing of claim 1 wherein the prestressing element comprises two clamping legs that are in direct contact with the circumferential ends of the inner ring and are spaced apart in the circumferential direction.

9. The plain bearing of claim 8 wherein the inner ring is capable of and configured to be in direct contact with the steering spindle.

10. The plain bearing of claim 1 wherein the radial slot causes the inner ring to be an open loop, with the radial slot extending from a radially-innermost portion of the inner ring to a radially-outermost portion of the inner ring such that the radial slot is open to an interior of the inner ring and open to an exterior of the inner ring.

11. A steering column for a motor vehicle, comprising:
    a rotatably mounted steering spindle, and
    a plain bearing configured to rotatably mount the steering spindle therein, the bearing comprising:
        an inner ring with an axially continuous bearing opening configured to slidably receive the steering spindle, wherein the inner ring includes a radial slot defined by oppositely facing circumferential ends in a circumferential direction of the inner ring, and
        an outer ring surrounding the inner ring, and
        a prestressing element is configured to exert a prestressing force on the circumferential ends of the inner ring and clamp the inner ring on the steering spindle.

12. A plain bearing for a steering spindle of a steering column for a motor vehicle, comprising:
    an inner ring with an axially continuous bearing opening configured to slidably receive the steering spindle, wherein the inner ring comprises a radial slot defined by oppositely facing circumferential ends in a circumferential direction of the inner ring; and
    a prestressing device configured to engage with the circumferential ends of the inner ring, the prestressing device configured to exert on the inner ring a prestressing force that squeezes together the circumferential ends and clamp of the inner ring on the steering spindle,
    the prestressing device further comprising an adjuster configured to variably set the prestressing force.

13. The plain bearing of claim 12, the adjuster comprising an adjusting drive.

14. The plain bearing of claim 12, wherein the prestressing device comprises two clamping legs spaced apart in the circumferential direction, which are in direct contact with the circumferential ends.

15. The plain bearing of claim 14, wherein the adjuster is arranged between the clamping legs.

16. The plain bearing of claim 14 wherein the inner ring is capable of and configured to be in direct contact with the steering spindle.

17. The plain bearing of claim 12, wherein the adjuster comprises at least two different pairs of engaging portions on the inner ring, between which the prestressing device is mountable.

18. The plain bearing of claim 12, wherein the prestressing device is formed as a single piece construction of molded sheet metal and includes two or more of a clamping leg, a clamping lever, a supporting element, or a spindle nut.

19. The plain bearing of claim 12, wherein the inner ring is formed of plastic.

20. The plain bearing of claim 12, comprising an outer ring surrounding the inner ring.

21. The steering column of claim 20, wherein the prestressing device comprises a spring.

22. A steering column for a motor vehicle, comprising:
    a rotatably mounted steering spindle, and
    a plain bearing configured to rotatably mount the steering spindle therein, the bearing comprising:
        an inner ring with an axially continuous bearing opening configured to slidably receive the steering spindle, the inner ring comprising a radial slot defined by oppositely facing circumferential ends in a circumferential direction of the inner ring such that the inner ring forms an open loop, wherein the inner ring is in direct contact with the rotatably mounted steering spindle,
        an outer ring surrounding the inner ring, and
        a prestressing device configured to exert a prestressing force on the circumferential ends of the inner ring and clamp the inner ring on the steering spindle, wherein the prestressing device comprises an adjuster configured to variably set the prestressing force, wherein the prestressing device includes two clamping legs that are connected to the circumferential ends and are spaced apart in the circumferential direction.

* * * * *